United States Patent [19]

Wolf

[11] Patent Number: 5,673,315

[45] Date of Patent: Sep. 30, 1997

[54] METHOD AND SYSTEM FOR SOFTWARE ASSET USAGE DETECTION AND MANAGEMENT

[75] Inventor: Timothy J. Wolf, Raleigh, N.C.

[73] Assignee: International Business Machines Corporation, Armonk, N.Y.

[21] Appl. No.: 506,045

[22] Filed: Jul. 24, 1995

Related U.S. Application Data

[63] Continuation of Ser. No. 196,913, Feb. 15, 1994, abandoned.

[51] Int. Cl.$^6$ .................. H04L 9/32; G06F 12/14
[52] U.S. Cl. .................. 380/4; 395/685; 395/712
[58] Field of Search .............. 380/3, 4, 25; 364/DIG. 1; 395/685, 712

[56] References Cited

U.S. PATENT DOCUMENTS

| | | | |
|---|---|---|---|
| 4,584,639 | 4/1986 | Hardy | 395/186 |
| 4,924,378 | 5/1990 | Hershey et al. | 395/187.01 |
| 4,937,863 | 6/1990 | Robert et al. | 380/4 |
| 4,941,175 | 7/1990 | Enescu et al. | 380/4 |
| 5,023,907 | 6/1991 | Johnson et al. | 380/4 |
| 5,138,712 | 8/1992 | Corbin | 395/186 |
| 5,204,897 | 4/1993 | Wyman | 380/4 |
| 5,222,134 | 6/1993 | Waite et al. | 380/4 |
| 5,319,705 | 6/1994 | Halter et al. | 380/4 |
| 5,375,206 | 12/1994 | Hunter et al. | 395/712 |
| 5,390,297 | 2/1995 | Barber et al. | 395/712 |

*Primary Examiner*—William M. Treat
*Assistant Examiner*—Kenneth R. Coulter
*Attorney, Agent, or Firm*—Edward H. Duffield

[57] ABSTRACT

Method and system for detecting attempted invocation of execution of any application program by searching each application's header file information for an operating system kernel Dynamically Linked Library DLL reference and replacing the operating system kernel DLL reference with a intercept routine DLL reference. The intercept routine will be invoked upon attempted invocation of the application program and contains management logic for any desired software asset management function for execution prior to permitting invocation and execution of the application program.

12 Claims, 6 Drawing Sheets

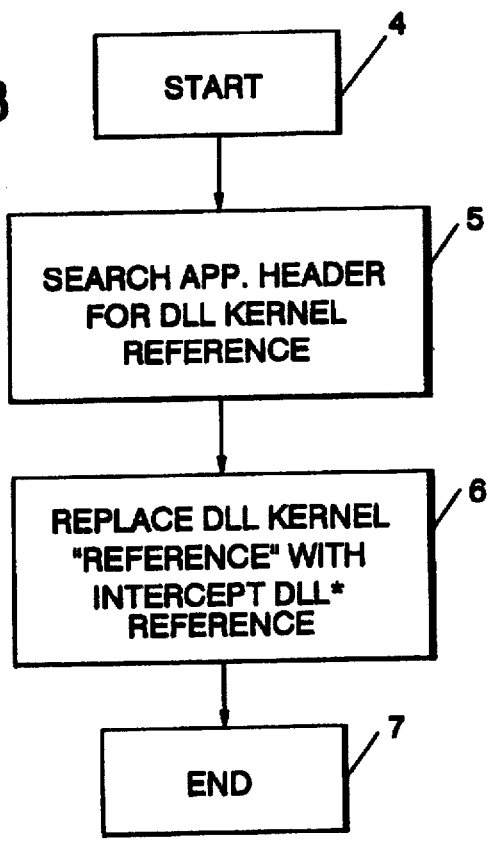
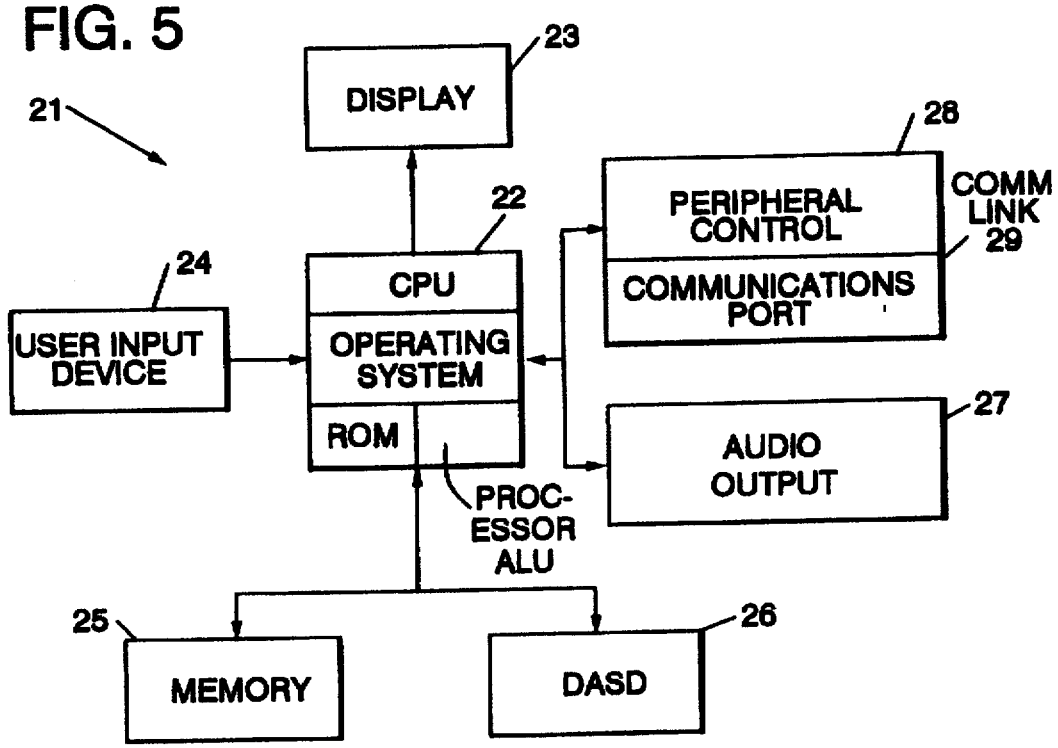

5,673,315

METHOD AND SYSTEM FOR SOFTWARE ASSET USAGE DETECTION AND MANAGEMENT

This is a continuation of application Ser. No. 08/196,913 filed Feb. 15, 1994 now abandoned.

FIELD OF THE INVENTION

This invention relates to computer system resource management systems and methods in general, and more specifically, to methods for managing the attempted installation and/or use of software assets, such as application programs, in a distributed or network environment.

BACKGROUND - PRIOR ART

The widespread proliferation of personal computers, workstations, or midsize computers linked together over communication networks has vastly increased the problem of software asset management. Software customers will often need to know and account for the programs that are being run in the customer's network at any given time. They need to know whether the programs are licensed to run, what the limits of the number of users are for each different asset which may be licensed from a vendor, the number of current users and the limit of total users that may be allowed, the location or machine id of each user, the number of times a software asset is used, the total time of utilization and, in some instances, the total time remaining under license for use of the asset.

Central to any of these management inquiries is the ability to detect attempted installation and/or execution of an application program anywhere in the network by any user. This is necessary not only for management of the assets within an entity such as a corporation, but also for accountability in asset protection to maintain the customer's usage within the allowed or licensed limits set by a software vendor, especially in light of potential civil and/or criminal liabilities for misuse of the assets. Local area networks (LANs) have exacerbated this problem to a great degree and have greatly increased the problems of licensing software for use.

Software piracy is a large and growing problem within the software industry. The ready accessibility provided by networks or LANs dramatically increases exposure of software to unlicensed users or to piracy.

Software vendors will customarily license users and charge them with management of software within limits imposed by their license.

A variety of tools are being made available for managing compliance with software vendor's license limitations, restrictions, terms and conditions of use, but they have become inadequate in a typical network environment.

The problem is further compounded by the advent of new kinds of licensing terms for software assets. Historically, the predominant licensing arrangement was known as "machine based" licensing, and the terms of this license required that the software be allowed to run only on a single, particularly specified, machine at any one time. As network systems have grown, this type of license has lost its attractiveness since many workstations or personal computers can have access over a network to the same software product, though it resides only on a single machine. This sharing, or networking, of usage may be precluded by some license terms to prevent the unauthorized usage and/or duplication of the software.

A wide variety of licensing forms have evolved. Some contemplate current "use" licensing. This form of licensing restricts usage of the application to a fixed number of users running the same asset at any given time. Another form is the "try and buy" licensing, which allows a user to try the software product for a given number of times before purchasing it. A "pay per use" license, in which the software is leased based upon its actual usage, is another form of licensing that is growing. "Period of usage" is another form of license in which the software is licensed for a period of time, after which it is expired or must be renewed.

As more of the new licensing schemes evolve, they require not only the detection of an attempt to execute a given application program, but the ability to prevent its execution if license restrictions are not being met.

Management software vendors are responding to this condition with software management tools that address the license conformance issues. The dominant form of solution employed requires that the license application software reside on a LAN server, rather than on an individual's machine. From this vantage point, the LAN server can operate a management program to limit the number of accesses or users at any one time. Such a network based scheme is a popular one for software vendors because it allows control of accesses to an asset from a single point in the system. It utilizes the inherent capabilities provided in a LAN network operating system to control access to a shared resource such as a software application program. However, the solution is not an ultimate one since it requires that the software reside in a LAN server in order for the license terms to be observed and managed. This is clearly inappropriate in a number of software products that simply run too slowly when placed on a LAN server, or which otherwise need to be physically existent at a user's workstation.

In order to allow software to reside at a user's workstation and still control its execution, a method is needed for all major operating systems to allow a software management tool to detect an attempt to execute the software and to conditionally prevent its execution. A preferred solution should be generic and pervasive, but unfortunately, not all major operating systems provide such a capability.

A typical DOS (Disk Operating System) provides a mechanism in which a software tool can be written to detect interrupts at specified operating system levels to detect the execution of a program and to conditionally prevent its execution if limits are not within the licensed parameters. Special interfaces have been created in operating systems to permit the writing of management agents or programs that can register themselves with the operating system to be notified by the operating system when a program has been loaded for execution. Still other operating systems, such as IBM's OS/2* (* Registered Trademark of International Business Machines Corporation) provides no equivalent means for detection or prevention of program execution.

OBJECT OF THE INVENTION

In view of the forgoing difficulties and limitations in the known prior art, it is an object of this invention to provide an improved method and system for detecting any attempt to execute an application program in the operating system of a personal computer, workstation, or the like.

BRIEF SUMMARY OF THE INVENTION

The present invention, as illustrated by the preferred embodiment thereof specifically described herein, is based on the finding that in a typical OS/2 operating system, any application program must include a control header of information which includes specific calls to the operating system program. One of these is a specific DOSCALL to a Dynamic Linked Library (DLL) routine that contains a kernel of code necessary to invoke action by the operating system. In the present invention, each application program whose usage is to be detected and/or monitored for management purposes, is first scanned in its header portion to find any DLL references to DOSCALLs. This references a kernel of code for invoking the operating system. Each such reference is replaced with an intercept DLL. The intercept DLL will invoke a new routine that performs management logic functions and then passes operation, if the parameters of the logic functions are within limits, to the original operating system kernel.

BRIEF SUMMARY OF THE DRAWINGS

The invention will be further described with reference to a preferred embodiment thereof which is further shown and described with reference to the drawings including the following:

FIG. 3 illustrates schematically the initial process of placing a substitute for DOSCALLS into the application header.

FIG. 5 illustrates a typical computer system in which the present invention may be implemented.

DETAILED DESCRIPTION OF THE PREFERRED EMBODIMENT

Figure 1:
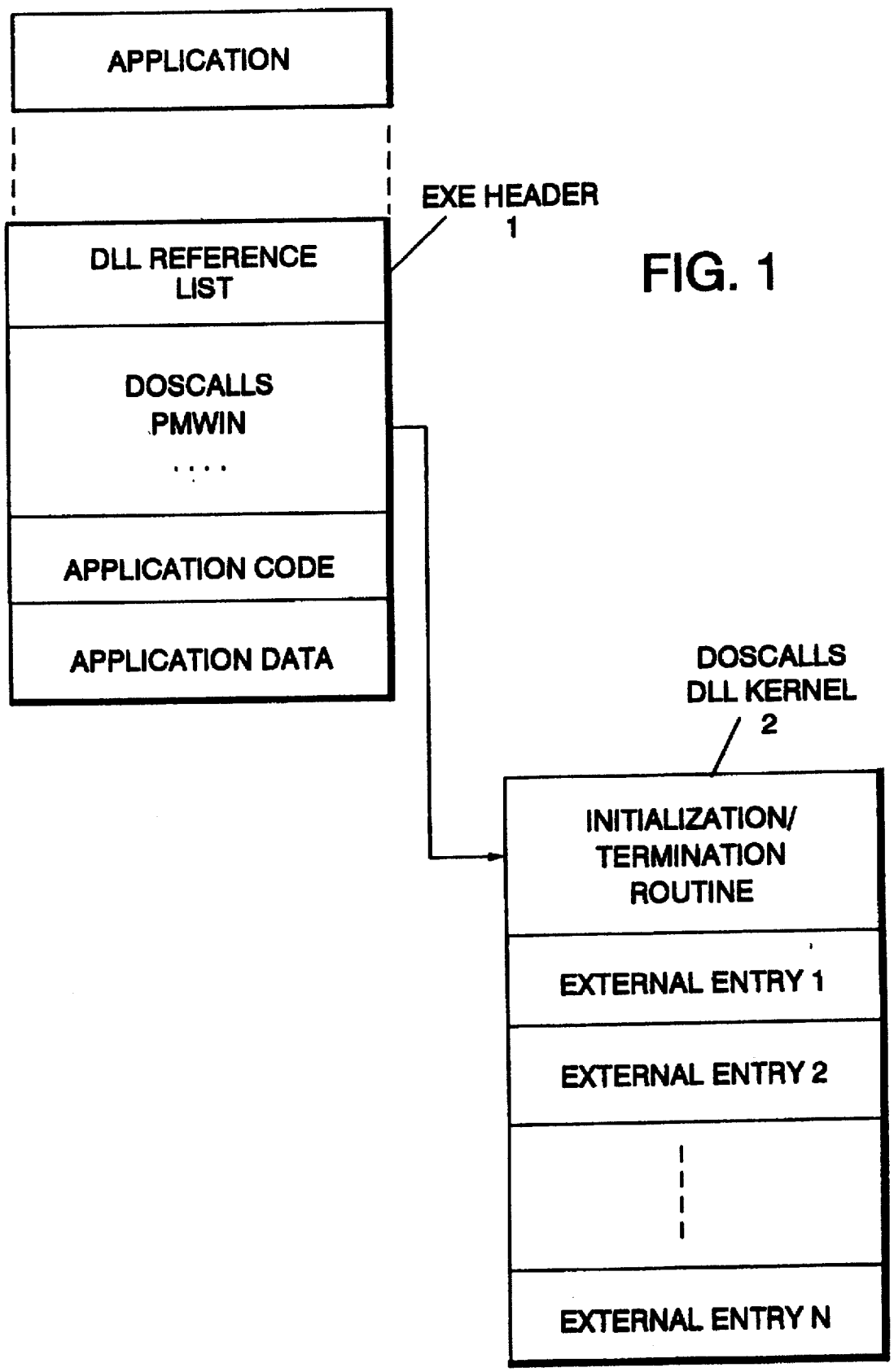
FIG. 1 illustrates schematically a visual process depiction of how an application executing in an OS/2 environment includes in its descriptive header a DLL reference list for required preloading of necessary DLLs that contains the DOSCALLs request. It shows how, when the DOSCALLs reference is encountered in the header of the application, a DOSCALLs DLL kernel of the operating system is invoked to begin the initialization and termination routines required to invoke actions by the operating system. Each of these DLLs will be loaded by the operating system during the application load. The DOSCALLS DLL, since it contains the operating system kernel ADIS, will be present in this list.

The solution to the problem posed above is based on the fact that all application software programs designed to operate on IBM's OS/2 operating system must first load a Dynamic Link Library containing the OS/2 operating system kernel. Only through interfaces provided in this Dynamic Linked Library routine can an application perform or invoke any of the operating system's functions.

Each executable module of code in the application program will have a header containing certain information stored at the start of the file which is generated at the program creation time by the linker. The header information is read by an OS/2 program loader when the program is to be executed. It gives the loader a number of important pieces of information needed to begin the program's successful initialization and execution. Among pieces of information needed by the program loader are the names of the Dynamic Link Libraries that the operating system must preload prior to turning control over to the application program. One entry that always exists in the preload list will be the OS/2 kernel DLL named "DOSCALLS.DLL".

Every time a DLL is loaded by the operating system, the system first executes specialized code that exists with each DLL routine called the "initialization header routine". If for any reason the initialization header routine cannot execute successfully, an indication of this fact is returned to the operating system and the application will simply not load or run.

The solution in the present invention is that the DOSCALLS.DLL specification is detected in the executable header portion and is replaced with a substitute call to a DLL other than the DOSCALLS.DLL. This other DLL will have its initialization routine called instead of DOSCALLS. The substitution of this new DLL, called an "interceptor DLL", is automatically performed by a utility routine that searches each application executable module and replaces the DOSCALLS.DLL kernel calls with the identity of the interceptor DLL instead. The interceptor DLL's initiation and termination routine is written to contain whatever management logic functions are desired.

Any attempt to run the application program containing the interceptor DLL is automatically detected since, upon being called, the interceptor DLL will be aware that an attempt is being made to execute the program. This fact can be logged, counted and compared to stored counts of authorized usage limits, authorized user identities, etc. to any extent necessary to address the management issues identified at the outset hereof. The name of the application program that is attempting to run is available to the interceptor DLL initialization routine and this routine can execute any appropriate set of logic needed to control, log, account for or prevent execution of the program. A simple indication back to the operating system that the DLL failed to load can be issued when it is found that the attempted execution is beyond license limits, and will thereby cause it not to load or execute.

If the management functions in the initialization routine of the intercept DLL complete successfully, then the program application may be permitted to go about normal setup and begin to execute. This is easily achieved by initialization routine in the interceptor DLL containing an export call to the original DOSCALLS.DLL kernel to invoke its operation as would have normally occurred without the interceptor DLL being present. The termination portion of the interceptor DLL can be set to detect the end of execution of the application program and to time the duration, if that is an important factor, or to account that a current use license limit may now be decremented since usage has ceased at this workstation or computer.

The interceptor DLL must be constructed with the entry point "DLLInitTerm", which is the entry point that is called by OS/2 when the DLL is loaded or unloaded. Appendix I illustrates the typical construction of a intercept DLL containing the entry point. A name of this new DLL or intercept DLL must be contained in a module definition file as shown in Appendix II. This is the name that will replace the normal DOSCALLS.DLL in the application program's executable header information. A simple tool can be constructed as shown in FIG. 3 to search any application program that is attempted to be run to locate the DLL entry list in the module's header to find the DOSCALLS and replace them with the intercept. DOSCALLS module name from Appendix II.

The process of a normal DOSCALLS.DLL is shown in FIG. 1.

Turning to FIG. 1, the normal OS/2 executable environment shows an application being invoked to run in Box 1. The application has an executable header including a list of reference DLLs that must be preloaded. Among these will appear the DOSCALLS.DLL reference as shown. This DLL contains the kernel of code necessary for the initialization and termination routine and links to other operating system components as shown in Box 2.

Figure 2A:
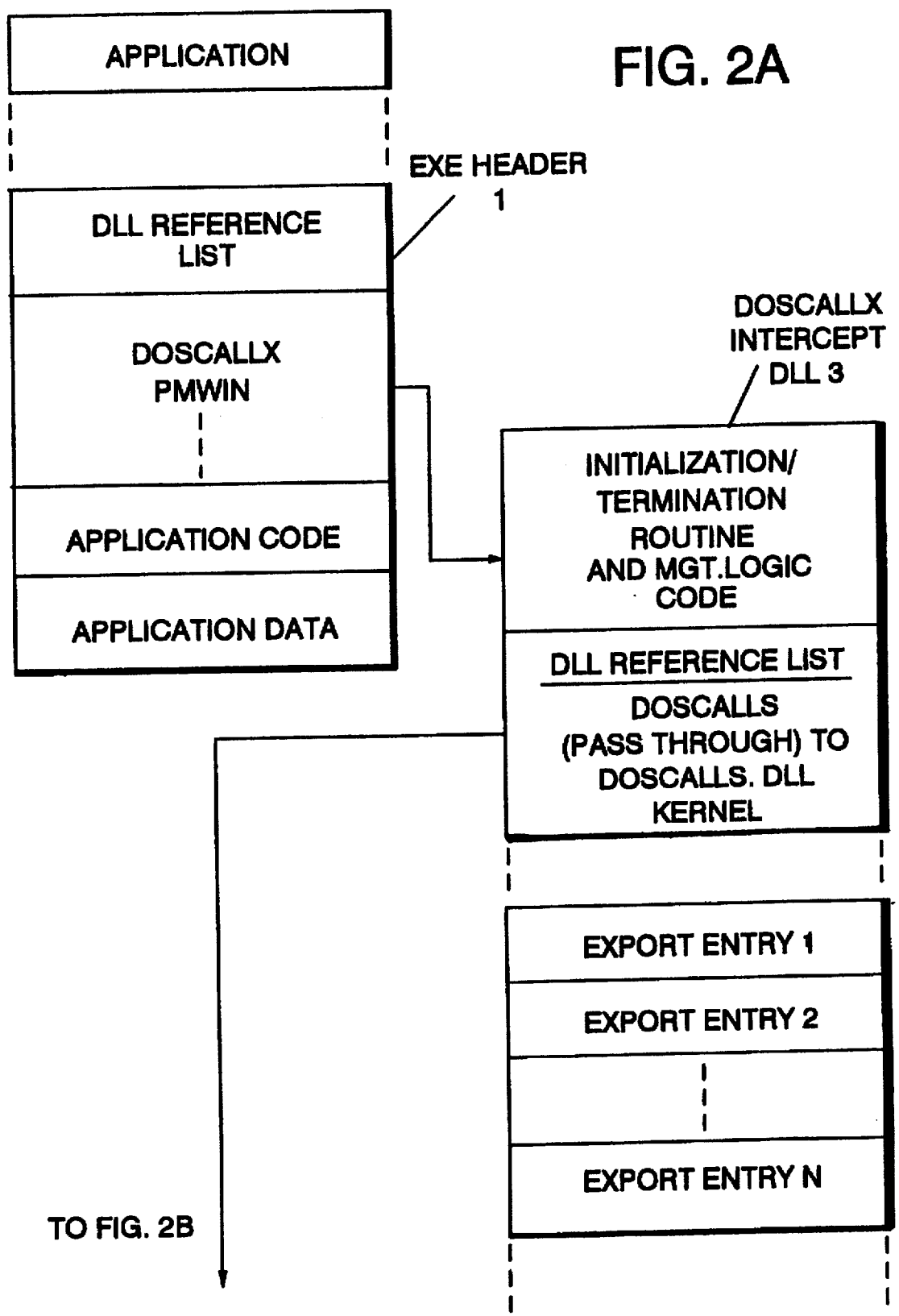
FIGS. 2A and 2B illustrate schematically the operation of the preferred embodiment of the invention including a DOSCALL intercept DLL sequence.
Figure 2B:
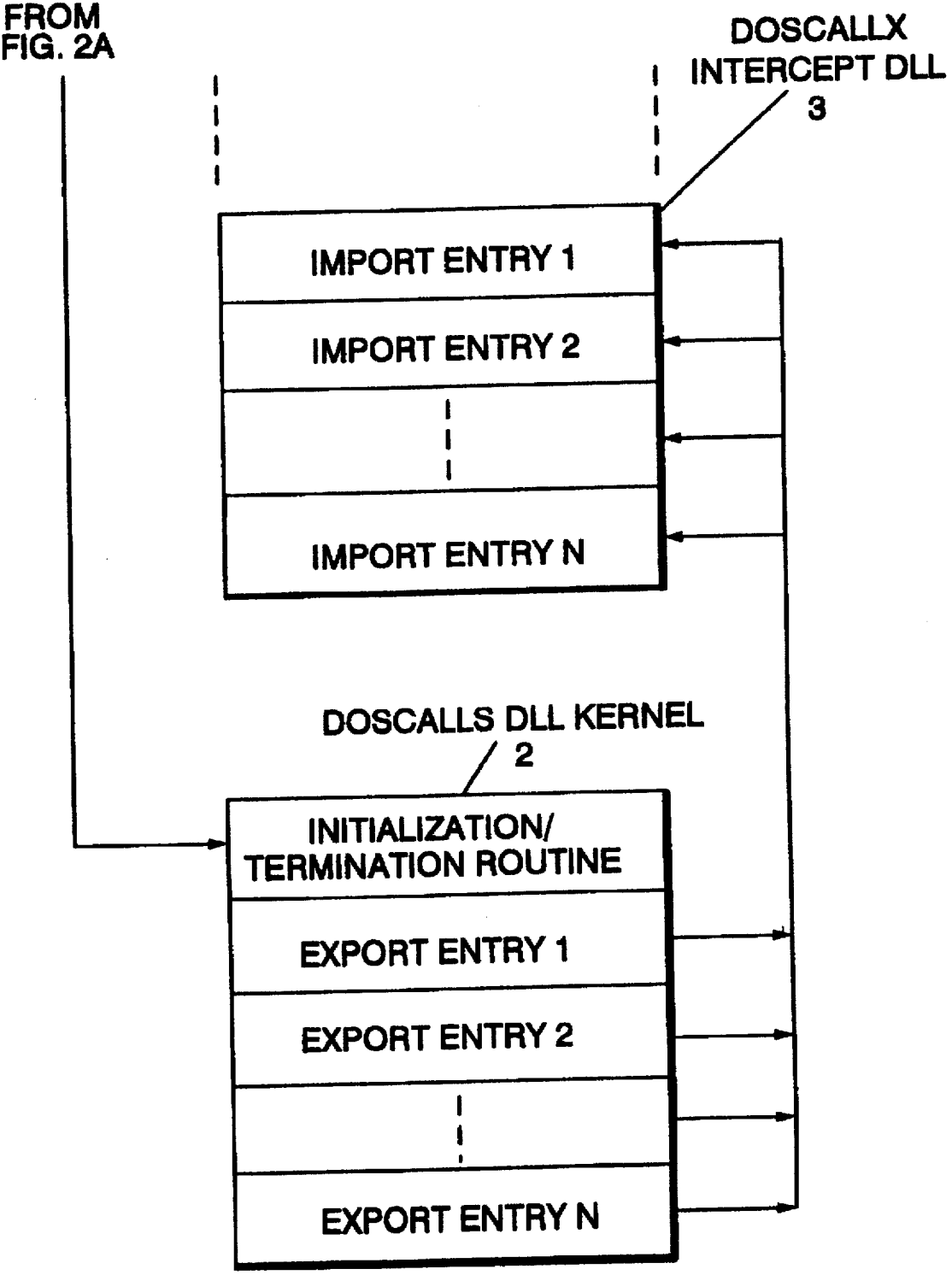

Turning to FIG. 2, the function of the intercept DLL, reference "DOSCALLX", is shown. The original application's executable header information has had the DLL reference list modified to rewrite the DOSCALLS reference specification to be "DOSCALLX", an arbitrarily chosen name (or reference) for the interceptor DLL. The operation of the system will then lead to accessing the DOSCALLX.DLL which will contain a substitute initialization and termination routine and any necessary asset management logic to account for determining whether there is a current valid license to run this application, what the limits or count of license usages may be, whether the user limit has been exceeded, whether the machine id is not within the licensed ids, the number of times of usage, the total elapsed time of usage, and the time at which the license may be used up, to name but a few logic management matters that may be addressed in this routine.

Box 1 of FIG. 2 shows the application program's executable header information with DOSCALLX replacing the original DOSCALLS.DLL. Box 3 shows the interceptor DLL, named DOSCALLX, which contains the initialization and termination routine for this DLL and any management logic as represented by the notation within Box 3. It also shows a link to the DOSCALLS.DLL kernel when the intercept DLL has determined that invocation and execution of the application is within the prescribed limits. This is shown by the link to the DOSCALLS.DLL kernel from Box 3 to Box 2.

FIG. 3, the interceptor DLL insertion routine, is shown schematically. Operation begins in Block 4 which causes a search throughout the application program's header for any DOSCALLS.DLL kernel specifications. Block 5 shows this test, and upon finding any DOSCALLS.DLL kernel calls, Block 6 shows that the DLL kernel will be replaced with the interceptor DLL identity, and when this is completed the process ends in Block 7.

Figure 4A:
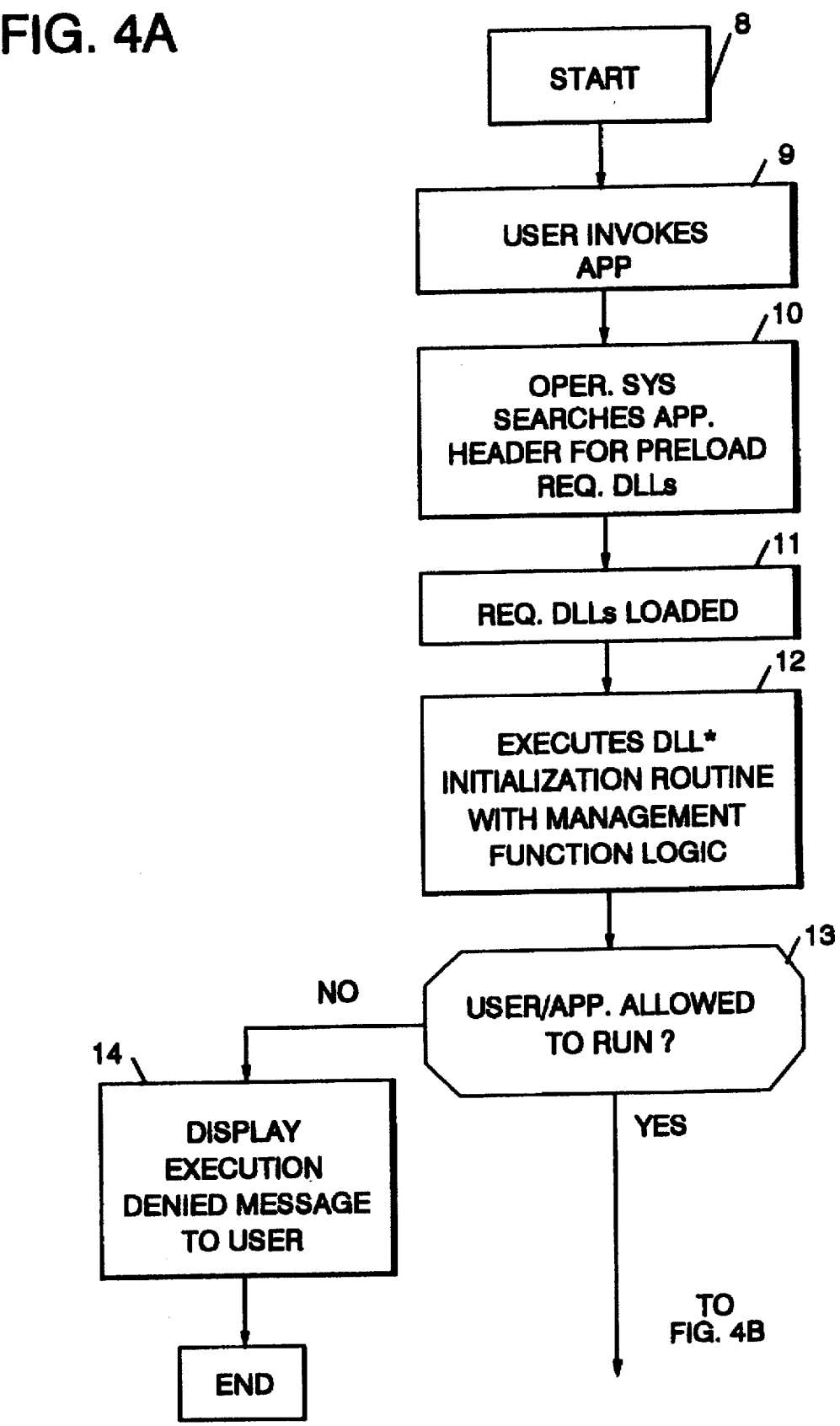
FIG. 4A and 4B illustrate the logic sequence of the operation depicted in FIG. 2 showing the steps carried out to intercept an attempted DOSCALL to the operating system kernel and to execute instead an initialization and termination routine containing appropriate management function logic, as will be described in greater detail.
Figure 4B:
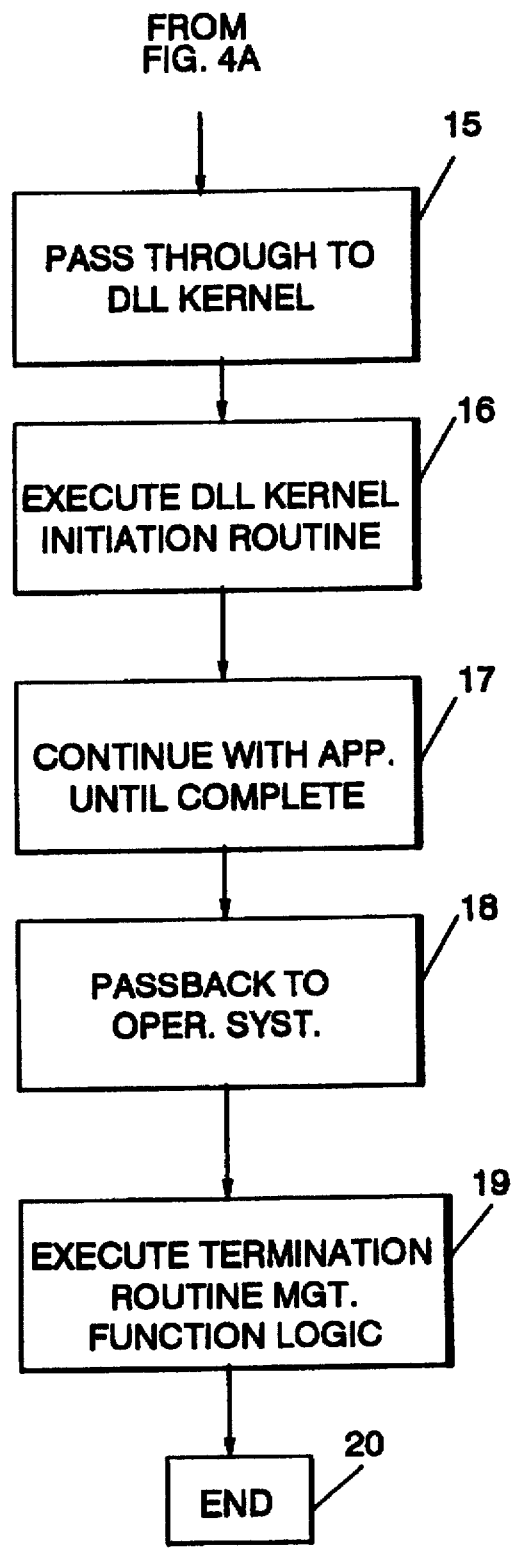

FIG. 4 illustrates schematically the overall operation once a user invokes an application whose application header has been modified by the process of FIG. 3. Operation begins in Block 8 with starting or the initial command by the user to invoke an application.

Block 9 is the point which the user invokes an application by name or command which causes the operating system in Block 10 to search the application's header for any preloaded required DLLs. In Block 11, the required DLLs are loaded by the operating system, and in Block 12 the DLL, which is the intercept DLL, is executed, and its initialization routine with management function logic as illustrated in Box 3 of FIG. 2 is executed. The output from Box 12 goes through Block 13 to determine whether the user's application would be allowed to run. If the answer is yes, the passthrough to the original DLL, kernel as shown in Box 3 of FIG. 2 occurs in Box 15 in FIG. 4. This causes execution of the original DOSCALLS.DLL kernel initiation termination routine in Box 16 and operation on the application program continues in Block 17 until the application is finished or terminates, whereupon a passback to the operating system in Block 18 and execution of the termination routine of management function logic occurs in Block 19 to the end in Block 20.

Returning to Block 13 of FIG. 4, if the user or the application's execution is not to be permitted due to the, management logic function indicating that prescribed parameters of usage have not been met, a message may be displayed to the user indicating that execution has been denied and stating any associated reasons such as "unlicensed code", "beyond licensed limit" of users, "beyond licensed number of usage instances", etc.

As is apparent to those of skill in the art, any specific management logic functions can be easily encoded for operation upon execution of the initiate terminate routine of the intercept DLL. Appropriate tests may be easily implemented by referring to a number of registers which have been preloaded with applicable management or licensed limits of usages, lists of authorized userids, limits on total elapsed time of use or numbers of usages, etc., all of which may be updated periodically by communication over a network to the user's workstation or terminal.

A typical computer system 21 is shown in FIG. 5. The system may form a typical node in a communication network which may be a local area network (LAN), or a distributed multi-node communication network of either national or international span.

In FIG. 5, the computer system 21 may include the typical central processing unit (CPU) 22 that typically incorporates an operating system, read only memory (ROM) for the processor's resident control code, and a processor arithmetic and logic unit (ALU) as shown within Box 22. A display, which may be a CRT, a printer, or any other means for communicating to an operator, is shown as 23 linked to the CPU 22. User input devices, such as mice, a keyboard, a joystick, audio input, and the like, are indicated generally in Box 24, connected to the CPU 22. Two-way communication between the CPU 22 and a direct access storage device, such as a disk drive 26 or bulk memory 25, is also shown. An audio output 27 may be included, as in a multimedia terminal or personal computer, and a peripheral control IO 28 with a communications port connected to communication link 29, by which the computer system 21 may be linked over a communications network or local area network to numerous other computer systems, is also shown.

Having thus illustrated an invention with respect to a preferred embodiment thereof, it will be evident to those of skill in the art that numerous management function routines can be incorporated into the initiation and/or termination routine code for the intercept DLL to suit the needs of any management functions. Therefore, what is described by the claims which follow and what is desired to be protected by letters patent is shown by way of example and not of limitation.

Wherefore, what is claimed is:

1. In a computer system having a processor, a program memory, and a program execution operating system, a method of managing application program utilization by detecting attempted execution of any application program by said processor, including steps in said processor of:

reading an application program header comprising Dynamically Linked Library (DLL) routines identification references;

loading into said program memory any said DLL routines identified in said header portion of said application program;

executing program logic found in any said DLL routines; and only loading into said program memory a new DLL containing an operating system kernel permitting execution of said application program if the said execution of program logic in at least one of said DLL routines provides execution permission for said application program.

2. A method as described in claim 1, further including a step of recording in said memory said executing of said DLL providing said execution permission logic as a record of attempted usage of said application program.

3. A method as claimed in claim 2, further including a step of recording in said memory a record of said application program's identity.

4. A method as claimed in claim 3, further including recording in said memory a record of the time at which execution of said application program begins.

5. A method as described in any one of claims 1 through 4, further including a step of returning operation by said operating system to said at least one DLL containing said application usage condition logic at the termination of said execution of said application program.

6. A method as claimed in claim 5, further including a step of recording in said memory a record at the time of which execution of said application program ended.

7. A method as described in any one of claims 1 through 4, further including a step of searching said application program header to locate a reference to the operating system kernel DLL and, replacing said reference in said application program header with a substitute DLL reference identifying a substitute DLL which contains execution permission logic including a conditional pointer to pass execution from said substitute DLL to said original DLL only if said execution permission is provided by execution of said substitute DLL.

8. A method as described in claim 5, further including a step of searching said application program header to locate a reference to the operating system kernel DLL and, replacing said reference in said application program header with a substitute DLL reference identifying a substitute DLL which contains execution permission logic including a conditional pointer to pass execution from said substitute DLL to said original DLL only if said execution permission is provided by execution of said substitute DLL.

9. A method as described in claim 6, further including a step of searching said application program header to locate a reference to the operating system kernel DLL and, replacing said reference in said application program header with a substitute DLL reference identifying a substitute DLL which contains execution permission logic including a conditional pointer to pass execution from said substitute DLL to said original DLL only if said execution permission is provided by execution of said substitute DLL.

10. A method is described in any of claims 2 through 4, further including steps of:

comparing said record of attempted usage of said application program against a prestored number representing the authorized limit of use of said application program; and directing said loading into said program memory of said DLL containing said operating system kernel only if said record of attempted usage does not exceed said authorized limit.

Appendix 1 - Sample 'C' source code to implement DLL initialization header
int _CRT_init(void);

-continued

```
void _CRT_term(void);
static PIB pib;
static PTIB tib;
unsigned long _System _DLL_InitTerm(
                  unsigned long hModule,
                  unsigned long ulFlag )
{
  switch(ulFlag)
  {
    case 0: // Indicates 'Program Starting'
    {
      if (_CRT_init ( ) ==-1) // Required
        return 0UL; // Load Failed if unsuccessful
      // Program is attempting to run . . .
      // One way to get the name of the program running is to use
      //
      // DosGetInfoBlocks(&tib,&pib);
      //
      // pib ->pib_pchcmd holds the command line used
      // to start the program
      //
      //
      //
      if (PermissionToRun( )) // perform any verification desired
        return(1UL); // OK - Load is successful
      return(0UL); // Load Failed
      break;
    }
    case 1: // Indicates 'Program Stopping'
    {
      _CRT_term( );
        // Perform any cleanup or execution
        // termination logic here.
      return 1UL; // OK
    }
  }
  return 0ul;
}
```

Appendix 2 - Sample Module Definition File for Intercept DLL
The following is an example of a module definition file that might be used to create an intercept dll named DOSCALLX.DLL. Note that an Export in the intercept DLL DOSCALLX is no more than a passthrough to its corresponding Export in DOSCALLS
LIBRARY DOSCALLX INITINSTANCE TERMINSTANCE PROTMODE
DATA NONSHARED MULTIPLE LOADONCALL
CODE SHARED LOADONCALL
IMPORTS
  a0000001     =     DOSCALLS.1
  a0000002     =     DOSCALLS.2
  a0000003     =     DOSCALLS.3
  . . .
  a0000500     =     DOSCALLS.500
EXPORTS
  a0000001     @1
  a0000002     @2
  a0000003     @3
  . . .
  a0000500     @500
  _CRT_init 11. A computer software asset management system for a computer system having a processor, a program memory, and a program execution operating system, said computer system having at least one application program software asset whose usage in said computer system is to be managed, said management system comprising:

means in said computer system for reading a header portion of said application program software asset to locate therein any Dynamically Linked Library (DLL) routine references;

means in said computer system for loading into said program memory any said DLL routine found to be referenced in said header portion of said application's program;

means in said computer system's processor for executing any program logic contained in said DLL routines loaded into said program memory of said computer system; and means in said computer system responsive to the execution of said program logic of at least one of said DLLs for loading into said program memory a new DLL containing an operating system kernel, thereby permitting execution of said application program only when said program logic of said at least one DLL routine provides application execution permission upon execution of said program logic therein.

12. A tool for application program management in a computer system having a processor, a program memory, and a program execution operation system, wherein usage of said application program is to be managed, comprising:

means, effective in said computer system, for reading a header portion of said application program whose usage in said system is to be managed, and for locating in said header portion any references to Dynamically Linked Library (DLL) routines;

means, effective in said computer system, for loading into said program memory of said computer system any said DLL routine found to be referenced in said header portion;

means, responsive to said loading step and effective in said computer system's processor, for executing any program logic contained in said referenced DLL routines loaded into said program memory; and means, effective in said computer system and responsive to the execution of said program logic of at least one of said referenced DLL routines, for loading into said program memory a new DLL containing a computer operating system kernel, thereby permitting execution of said application program whose usage is to be managed, said loading occurring only when said program logic of said at least one referenced DLL routine provides execution permission, upon execution of said program logic therein.

* * * * *